(12) United States Patent
Phillips et al.

(10) Patent No.: US 10,404,541 B2
(45) Date of Patent: Sep. 3, 2019

(54) SMART DATA CAP AVOIDANCE WITH PERSONALIZED PREDICTIONS BASED ON LINEAR REGRESSION OR HISTORICAL USAGE ALPHA-GENERATION PATTERNS

(71) Applicant: TELEFONAKTIEBOLAGET LM ERICSSON (PUBL), Stockholm (SE)

(72) Inventors: Chris Phillips, Hartwell, GA (US); Robert Hammond Forsman, Sugar Hill, GA (US); Jennifer Ann Reynolds, Duluth, GA (US); Vishal Changrani, Duluth, GA (US)

(73) Assignee: ERICSSON AB, Stockholm (SE)

( * ) Notice: Subject to any disclaimer, the term of this patent is extended or adjusted under 35 U.S.C. 154(b) by 262 days.

(21) Appl. No.: 15/437,118

(22) Filed: Feb. 20, 2017

(65) Prior Publication Data

US 2018/0013629 A1 Jan. 11, 2018

Related U.S. Application Data

(60) Provisional application No. 62/359,374, filed on Jul. 7, 2016, provisional application No. 62/359,402, filed on Jul. 7, 2016.

(51) Int. Cl.
*G06F 15/16* (2006.01)
*H04L 12/24* (2006.01)
(Continued)

(52) U.S. Cl.
CPC .......... *H04L 41/0896* (2013.01); *H04L 12/14* (2013.01); *H04L 12/1403* (2013.01);
(Continued)

(58) Field of Classification Search
CPC . H04L 41/0896; H04L 12/14; H04L 12/1403; H04L 12/1407; H04L 12/2898;
(Continued)

(56) References Cited

U.S. PATENT DOCUMENTS 7,873,074 B1 1/2011 Boland
8,041,808 B1 10/2011 Becker
(Continued)

FOREIGN PATENT DOCUMENTS

WO WO 2013/191963 A1 12/2013
WO WO 2015/038277 A1 3/2015
(Continued)

*Primary Examiner* — Sm A Rahman

(57) ABSTRACT

A system, apparatus, and method for controlling data usage at a customer premises. A gateway configured as a single point of entry receives all data entering the premises. A DataCap Management Unit monitors all data usage by client devices within the premises and uses either a linear regression model or a historical usage alpha-generation method to analyze data usage patterns at the premises and to predict future data usage at the premises for a current billing cycle. The DataCap Management Unit dynamically adjusts a premises bandwidth cap throughout the current billing cycle, using the predicted future data usage as an input, to smoothly keep actual total data usage for the current billing cycle from exceeding a data cap before the current billing cycle ends.

32 Claims, 12 Drawing Sheets

(51) Int. Cl.
*H04L 12/28* (2006.01)
*H04L 29/06* (2006.01)
*H04L 12/14* (2006.01)
*H04M 15/00* (2006.01)
*H04W 4/24* (2018.01)
*H04L 12/911* (2013.01)

(52) U.S. Cl.
CPC ...... *H04L 12/1407* (2013.01); *H04L 12/2898* (2013.01); *H04L 41/142* (2013.01); *H04L 65/4092* (2013.01); *H04M 15/66* (2013.01); *H04M 15/8214* (2013.01); *H04M 15/8228* (2013.01); *H04W 4/24* (2013.01); *H04L 47/823* (2013.01)

(58) Field of Classification Search
CPC ... H04L 41/42; H04L 65/4092; H04L 47/823; H04M 15/66; H04M 15/8214; H04M 15/8228; H04W 4/24
USPC .......................................................... 709/217
See application file for complete search history.

(56) References Cited

U.S. PATENT DOCUMENTS

| | | | |
|---|---|---|---|
| 8,681,614 B1 | 3/2014 | McCanne et al. | |
| 8,874,477 B2* | 10/2014 | Hoffberg | G06Q 10/0631 705/37 |
| 9,046,854 B2* | 6/2015 | Yang | G03G 15/556 |
| 9,264,508 B2 | 2/2016 | Wolf et al. | |
| 9,628,405 B2* | 4/2017 | Dasher | H04L 47/801 |
| 10,158,727 B1* | 12/2018 | Mukhopadhyaya | H04L 67/16 |
| 2002/0023168 A1 | 2/2002 | Bass et al. | |
| 2005/0097206 A1* | 5/2005 | Rabinovitch | H04L 41/5003 709/224 |
| 2008/0037420 A1 | 2/2008 | Tang | |
| 2011/0188439 A1 | 8/2011 | Mao et al. | |
| 2013/0021933 A1* | 1/2013 | Kovvali | H04W 88/18 370/252 |
| 2013/0346624 A1* | 12/2013 | Chervets | H04M 15/58 709/231 |
| 2014/0280764 A1 | 9/2014 | Dasher et al. | |
| 2014/0281002 A1 | 9/2014 | Sun | |
| 2014/0282777 A1 | 9/2014 | Gonder et al. | |
| 2015/0249623 A1 | 9/2015 | Phillips et al. | |
| 2015/0334150 A1 | 11/2015 | Dasher et al. | |
| 2016/0086222 A1* | 3/2016 | Kurapati | G06Q 30/0204 705/14.53 |
| 2016/0277299 A1 | 9/2016 | Kadaba et al. | |

FOREIGN PATENT DOCUMENTS

WO WO 2015/155679 A1 10/2015
WO WO 2016/128890 A1 8/2016

\* cited by examiner

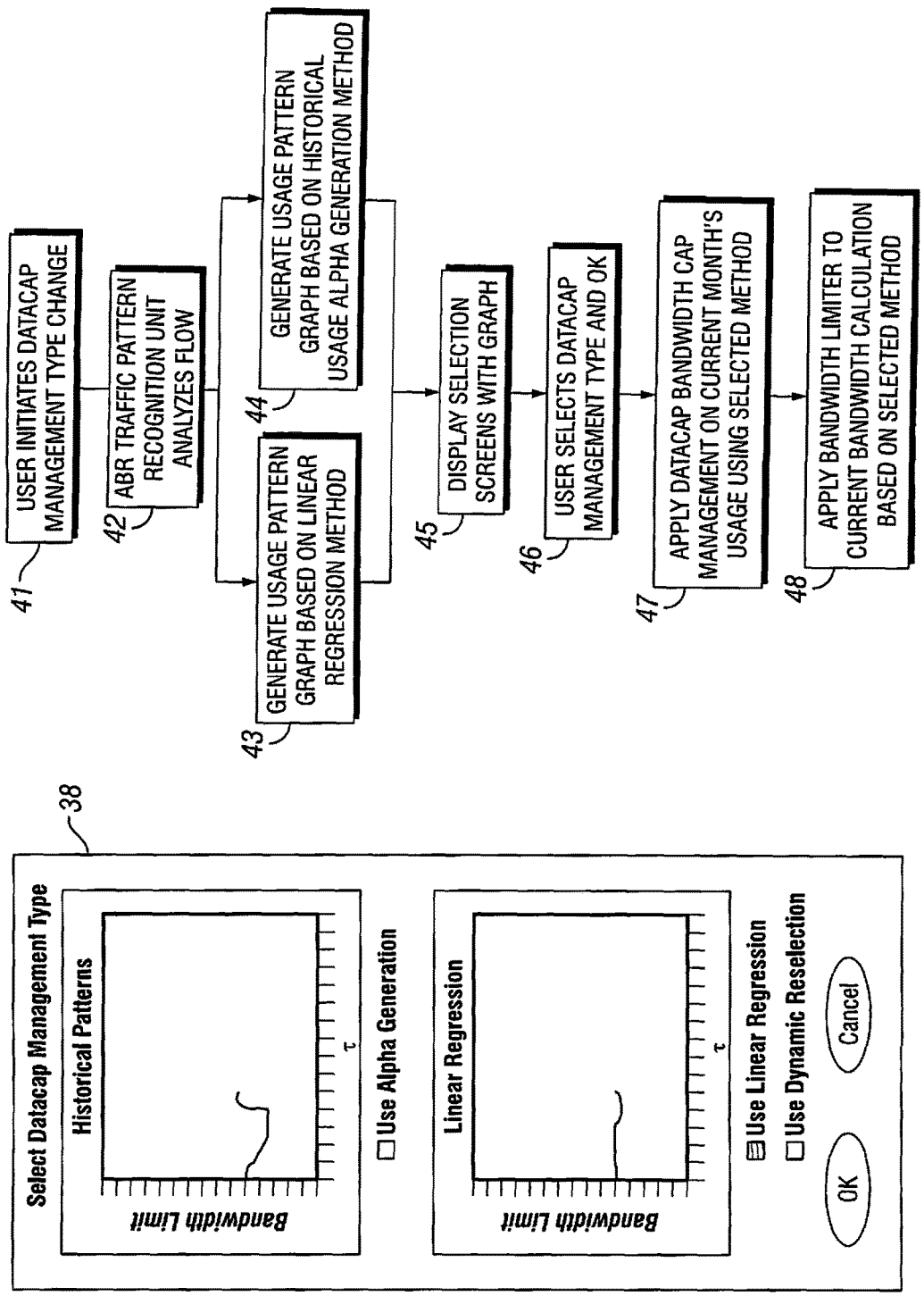

176.105568058049 + Match (Month)

| "Jan" | → | -64.202855755137 |
| "Feb" | → | -53.962710915192 |
| "Mar" | → | -33.739738651089 |
| "Apr" | → | -23.935449898057 |
| "May" | → | -5.7997552278477 |
| "Jun" | → | -3.7583103934012 |
| "Jul" | → | 10.8160788033725 |
| "Aug" | → | 15.8243616151036 |
| "Sep" | → | 26.1400877542043 |
| "Oct" | → | 35.7971442448627 |
| "Nov" | → | 48.2206404139593 |
| "Dec" | → | 48.6005570917365 |

+ Match (Day)

| "Fri" | → | -112.76993253852 |
| "Mon" | → | -62.429865330343 |
| "Sat" | → | 232.352202599909 |
| "Sun" | → | 137.324793006014 |
| "Thu" | → | -77.929281676321 |
| "Tue" | → | -52.422310407032 |
| "Wed" | → | -64.134905652887 |

+ Match (Holiday) 1 → -262.953330027297
0 → 0

FIG. 9

SMART DATA CAP AVOIDANCE WITH PERSONALIZED PREDICTIONS BASED ON LINEAR REGRESSION OR HISTORICAL USAGE ALPHA-GENERATION PATTERNS

RELATED APPLICATIONS

This application claims the benefit of U.S. Provisional Application No. 62/359,374 filed Jul. 7, 2016 and U.S. Provisional Application No. 62/359,402 filed Jul. 7, 2016, the disclosures of which are fully incorporated herein by reference.

TECHNICAL FIELD

The present disclosure relates to communication systems, and more particularly to a system, apparatus, and method for controlling delivery of data to a user to remain within a data cap while avoiding excessive data throttling.

BACKGROUND

Many network providers implement a "data cap", which limits the amount of data a user may consume, penalty free, over a period of time (for example, a month). If the user consumes more data than the cap allows, the provider may cut them off entirely from data, throttle their data to a very slow level, or impose exorbitant charges for overages. Existing technology lets users use data as fast as they want until they are suddenly cut off, throttled, or hit with an exorbitant charge.

Adaptive video bitrate (ABR) algorithms exacerbate this problem by balancing the bitrate (or quality of the video) with the current network conditions, with the goal of having the highest bitrate video possible.

SUMMARY

Existing technology controls bitrates at the application level, preventing a more organized decision making process about bitrate. Additionally, previously proposed solutions do not take into account personal usage patterns to provide an optimal bandwidth cap based on individual household usage.

The present disclosure addresses the problems of the existing technology through a DataCap Management Unit that accurately predicts monthly data usage, and uses the predicted data usage as an input to smoothly control bandwidth and keep data usage underneath the data cap throughout a billing cycle. In this way, the unit prevents a user from suddenly running out of data, and ensures that the user utilizes all of the data up to the data cap, which in most cases has already been paid for by the user. The DataCap Management Unit can implement one of two methods, using historical data or linear regression, in order to predict the best model for data cap management per household.

The DataCap Management Unit may be implemented, for example, in a custom over-the-top (OTT) gateway at the customer premises. This OTT gateway may communicate with the outside world by connecting to the service provider's gateway. By providing the sole connection for the household premises to connect to the Internet, the OTT gateway is able to monitor all data usage of the premises.

According to one embodiment, the DataCap Management Unit determines a data usage pattern based on either a linear regression method or based on a historical usage alpha ($\alpha$) generation method. Data cap bandwidth management is then applied on a current time frame using a selected one of the methods. A bandwidth limiter is applied to the current bandwidth calculation during the current time frame to ensure the data cap is not exceeded while avoiding excessive data throttling.

In one embodiment, the present disclosure is directed to a method of controlling data usage at a customer premises. The method includes predicting future data usage at the customer premises for a current billing cycle; monitoring all actual data usage at a single point of entry for the premises; and dynamically adjusting a premises bandwidth cap throughout the current billing cycle, using the predicted future data usage as an input, to smoothly keep actual total data usage for the current billing cycle from exceeding a data cap before the current billing cycle ends.

In another embodiment, the present disclosure is directed to a DataCap Management Unit for controlling data usage at a customer premises. The DataCap Management Unit includes an interface configured to receive all data entering the premises and to monitor all data usage by the premises; and a processing circuit configured to predict future data usage at the customer premises for a current billing cycle, and dynamically adjust a premises bandwidth cap throughout the current billing cycle, using the predicted future data usage as an input, to smoothly keep actual total data usage for the current billing cycle from exceeding a data cap before the current billing cycle ends.

In another embodiment, the present disclosure is directed to a system for controlling data usage at a customer premises. The system includes a gateway providing a single point of entry for data entering the premises; and a DataCap Management Unit configured to receive all data entering the premises from the gateway and to monitor all data usage by the premises; predict future data usage at the customer premises for a current billing cycle; and dynamically adjust a premises bandwidth cap throughout the current billing cycle, using the predicted future data usage as an input, to smoothly keep actual total data usage for the current billing cycle from exceeding a data cap before the current billing cycle ends.

The disclosed DataCap Management Unit benefits end users by allowing them to enjoy video without worrying about going over their data cap. The DataCap Management Unit benefits content providers by allowing more content to be consumed and creating happier customers. Because the unit accurately predicts data usage, it allows users to use as much data as possible for as long as possible during the billing cycle while still avoiding going over the data cap. Operation of the DataCap Management Unit may also be optimized based on individual household usages.

Further features and benefits of embodiments of the present disclosure will become apparent from the detailed description below.

BRIEF DESCRIPTION OF THE DRAWINGS

In the following section, the invention will be described with reference to exemplary embodiments illustrated in the figures, in which:

FIG. 4 illustrates an exemplary display providing a user with the capability to select between the historical usage alpha ($\alpha$) generation method or the linear regression method of data cap management;

FIG. 5 is a flow chart of a method of selecting and using a Datacap management type in accordance with an exemplary embodiment of the present disclosure;

FIG. 9 shows a predicted daily model by linear regression (least square method);

DETAILED DESCRIPTION

Figure 1:
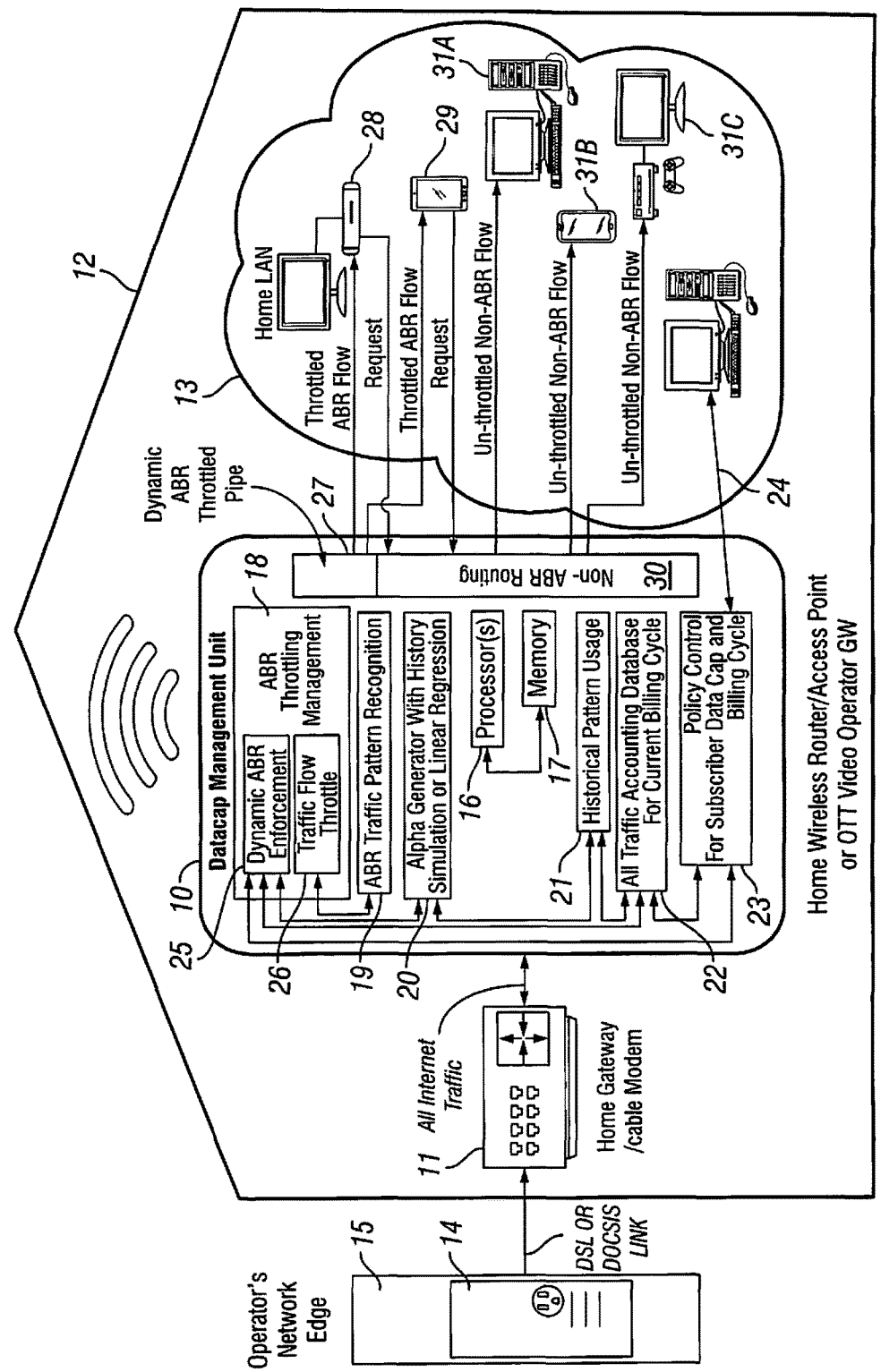
FIG. 1 is a simplified block diagram of an exemplary embodiment of the disclosed DataCap Management Unit implemented in a home or other premises.

The disclosed system will now be described more fully hereinafter with reference to the accompanying drawings, in which preferred embodiments of the system are shown. This invention may, however, be embodied in many different forms and should not be construed as limited to the embodiments set forth herein; rather, these embodiments are provided so that this disclosure will be thorough and complete, and will fully convey the scope of the assembly to those skilled in the art. In the drawings, like reference signs refer to like elements.

FIG. 1 is a simplified block diagram of an exemplary embodiment of the disclosed DataCap Management Unit 10 implemented between an Internet Service Provider (ISP) home gateway or cable modem 11 and all other client devices in a home or other premises 12. The DataCap Management Unit may be implemented, for example, in a home wireless router/access point, in an Over-the-Top (OTT) video operator gateway, or in another suitable gateway-type access point where all Internet traffic entering the premises may be monitored. The client devices may be connected to a Home Local Area Network (LAN) 13. Data may reach the home from a service provider's gateway 14 in an operator's network 15 via, for example, a Digital Subscriber Line (DSL) or Data Over Cable Service Interface Specification (DOCSIS) link. The service provider's gateway may be, for example a Digital Subscriber Line Access Multiplexer (DSLAM) or a Cable Modem Termination System (CMTS).

The DataCap Management Unit 10 may include a number of units controlled by a processing circuit comprising one or more processors 16 executing computer program instructions stored on a memory 17. The units may include an ABR Throttling Management Unit 18, an ABR Traffic Pattern Recognition Unit 19, an Alpha Generator with History Simulation or Linear Regression unit 20, a Historical Pattern Usage unit 21, an All Traffic Accounting Database 22 for the current billing cycle, and a Policy Control Unit 23 that provides policy control for the subscriber data cap and the billing cycle. A Datacap Policy Management Interface 24 enables a user to optimize policies based on individual household usage patterns. The ABR Throttling Management Unit 18 may further include a unit for dynamic ABR pipe bandwidth size enforcement 24 and a traffic flow throttle 26. A dynamic ABR throttled pipe 27 delivers throttled ABR stream flows to client devices engaged in ABR sessions such as, in this example, an ABR Set Top Box (STB) 28 and a tablet computer 29. A non-ABR routing unit 30 routes un-throttled non-ABR stream flows to client devices 31a-31c engaged in non-ABR sessions.

The various units interact to perform the actual throttling of ABR content, the recognition of ABR content (as in U.S. Patent Application Publication Ser. No. 2016/0277299 entitled System and Method for Categorizing Packet Flows in a Network) incorporated by reference herein, the recognition of data use patterns, the ability to predict future data usage, and to allow a household to control the policies of the DataCap Management Unit. In the illustrated embodiment, any device can connect to the unit in order to perform standard Internet interactions, but only ABR stream flows are throttled. Non-ABR stream flows are un-throttled.

Figure 2:
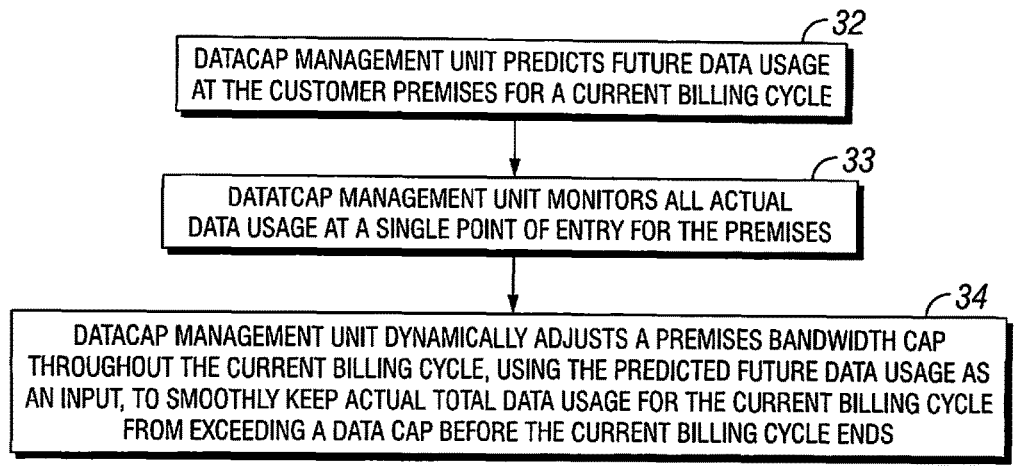
FIG. 2 is a flow chart of an overall method of data cap management in accordance with an exemplary embodiment of the present disclosure.

FIG. 2 is a flow chart of an overall method of data cap management in accordance with an exemplary embodiment of the present disclosure. At step 32, the DataCap Management Unit predicts future data usage at the customer premises for a current billing cycle. At step 33, the DataCap Management Unit monitors all actual data usage at a single point of entry for the premises. At step 34, the DataCap Management Unit dynamically adjusts a premises bandwidth cap throughout the current billing cycle, using the predicted future data usage as an input, to smoothly keep actual total data usage for the current billing cycle from exceeding a data cap before the current billing cycle ends.

Figure 3:
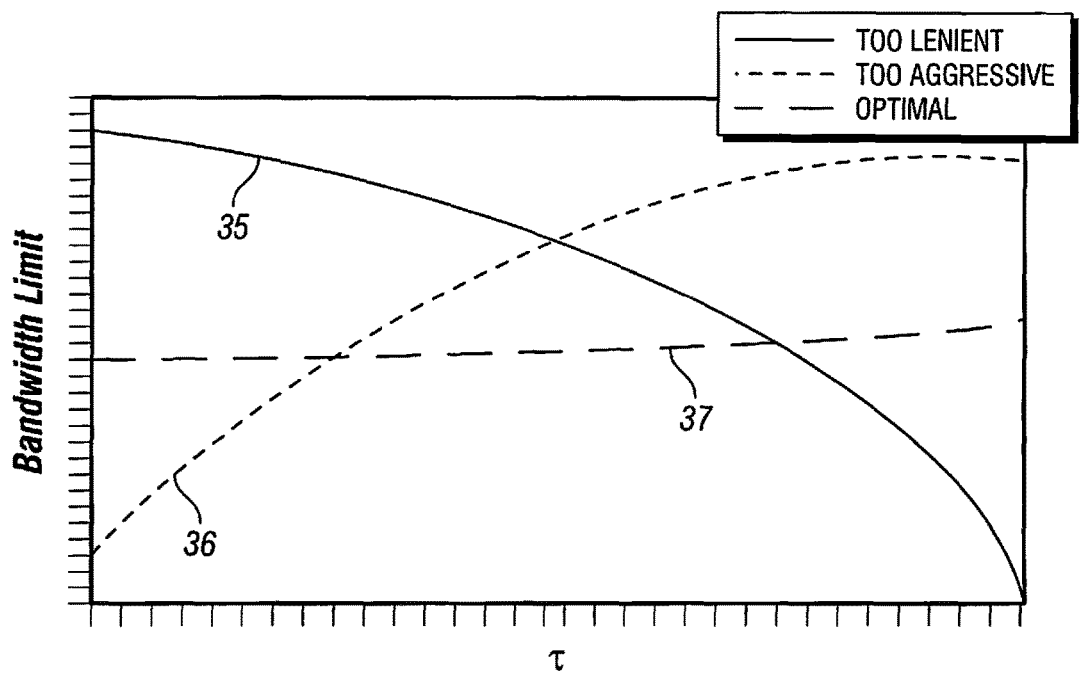
FIG. 3 is a graph of bandwidth limit as a function of time (t)

FIG. 3 is a graph of bandwidth limit as a function of time (t) such as a monthly billing cycle. The graph illustrates the purpose of both the linear regression method and the historical usage alpha ($\alpha$) generation method: best approximating predicted data usage. If the bandwidth limit is too lenient starting out (as represented by line 35), too much of the data cap will be utilized early in the month, and data throttling will have to become increasingly more aggressive towards the end of the month to remain within the data cap. This prevents a good user experience. On the other hand, if the bandwidth limit is too aggressive starting out (as represented by line 36), data will be excessively throttled initially, again preventing a good user experience. An optimal experience (as represented by line 37), would be to have the data consistently throttled at a rate that prevents excessive throttling throughout the month without going over the data cap.

Either the linear regression method or the historical usage alpha ($\alpha$) generation method may be implemented. Alternatively, both methods may be implemented and the DataCap Management Unit may select between them dynamically.

FIG. 4 illustrates an exemplary user interface display 38 providing a user with the capability to select between the historical usage alpha (α) generation method or the linear regression method of data cap management. Alternatively, the user may select to have the system dynamically reselect a preferred method. In this case, the system automatically recognizes the best method to use based on changes over time. For example, the system may examine the changes over a time period such as the last 1-5 days and automatically switch to the method offering the minimal changes over the time period.

FIG. 5 is a flow chart of a method of selecting and using a Datacap management type in accordance with an exemplary embodiment of the present disclosure. At step 41, a user indicates that a change of Datacap management type is desired. At step 42 the ABR Traffic Pattern Recognition 19 unit analyzes the data flow. At step 43, the Datacap Management Unit generates a usage pattern graph based on the linear regression method. At step 44, the Datacap Management Unit generates a usage pattern graph based on the historical usage alpha generation method. At step 45 the user interface displays the selection screen as shown in FIG. 4. At step 46, the user selects the desired Datacap management type and selects "OK". At step 47, the Datacap Management Unit applies Datacap bandwidth management on the current month's usage using the selected method. At step 48 a bandwidth limiter is applied to a current calculation of allowed bandwidth based on the selected method.

Linear Regression Method

In statistics, linear regression is an approach for modeling the relationship between a scalar dependent variable y and one or more explanatory variables (or independent variables) denoted x. The data cap management method disclosed herein is accomplished by analyzing past (historic) data usage of a household to predict what the future data usage will be and then applying appropriate bandwidth throttling to keep the ABR data usage under the cap. This problem of predicting future data usage from past usage information lends itself aptly to linear regression. The dependent variable for regression, y, in this case is the prediction of the future data usage, and the independent variables are past hourly data usage, daily data usage, and monthly data usage.

There are certain inherent patterns of hourly, daily, and monthly data usage of any individual or household. For example, weekday data usage in the evening between 6:00 pm to 10:00 pm (prime time) is very high as compared to data usage during other times of the day. This, however, changes during weekends. Overall, weekend data consumption is generally higher than weekday consumption. Similarly, monthly consumption also changes throughout the year and may be affected by the geographical location of the user. There are also certain special days (e.g., holidays) such as the 4th of July, Thanksgiving, Christmas, and the like when data usage may spike. The linear regression model attempts to provide an equation of the "best-fit" line which passes through all the data points. The model factors into account this variance in data usage and can fairly predict data usage for a given hour, day or month of a year.

In an embodiment of the disclosure, a linear regression model is generated for each household given its past data usage. The model is not static and is continuously improved by closing a feedback loop and updating the model by recalculating the coefficients as more recent data becomes available. The present disclosure considers only a simple linear regression model using the ordinary least square method, although more complex models may be envisioned within the scope of the invention.

Based on the input variables, an exemplary embodiment of the disclosure generates two different models—a daily linear regression model and an hourly linear regression model.

The daily linear regression model uses the past daily data usage and past monthly data usage as the independent variables and predicts usage for a given day. This predicted usage can then be divided by 24 to get hourly data usage assuming uniform data consumption during the day. The hourly regression model goes one step further and also takes into account the past hourly data usage as an independent variable. Thus the hourly model additionally factors in the variance in data usage during the course of the day.

Following are examples of the daily linear regression model and the hourly linear regression model. They have been generated using a sample annual data usage for a household.

Daily Linear Regression Model

Figure 6:
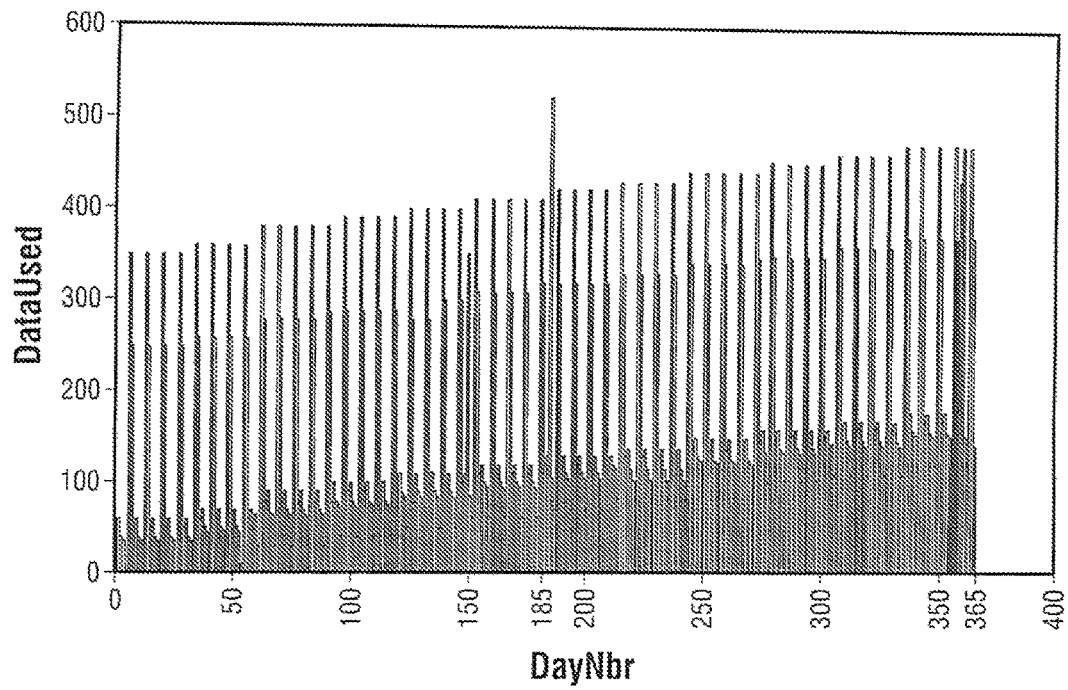
FIG. 6 is a graph of data used as a function of day number (DayNbr) showing an example of past year data consumption for a household for each day.

FIG. 6 is a graph of data used as a function of day number (DayNbr) showing an example of the past year's data consumption for a household for each day (DayNbr 1 to 365). Notice that after every five days the data consumption spikes. This spike is caused by the increase in weekend data consumption. In addition, there are also spikes on holidays such as the 4th of July (DayNbr 185).

A similar graph may be constructed with daily data usage overlaid with the day of the week. When this is done, a pattern may appear, which indicates, for example, that data consumption increases as the week progresses. Also, it becomes clear that the data consumption for weekend days is significantly higher than for weekdays.

Figure 7:
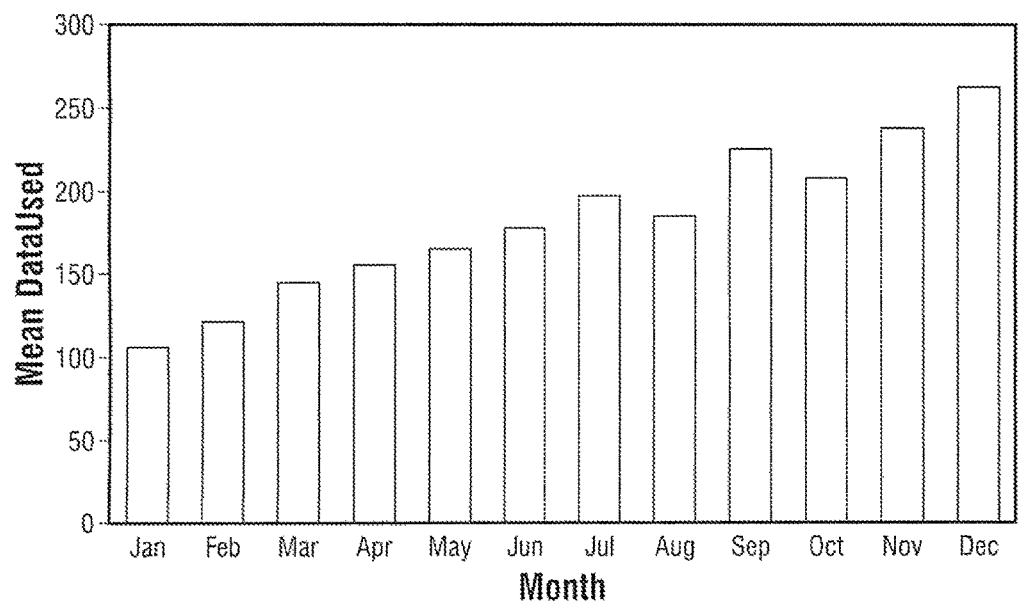
FIG. 7 is a graph of mean data usage as a function of the month of the year.

FIG. 7 is a graph of mean data usage as a function of the month of the year. The usage data in this example indicates a trend of increasing data consumption as the year progresses.

Figure 8:
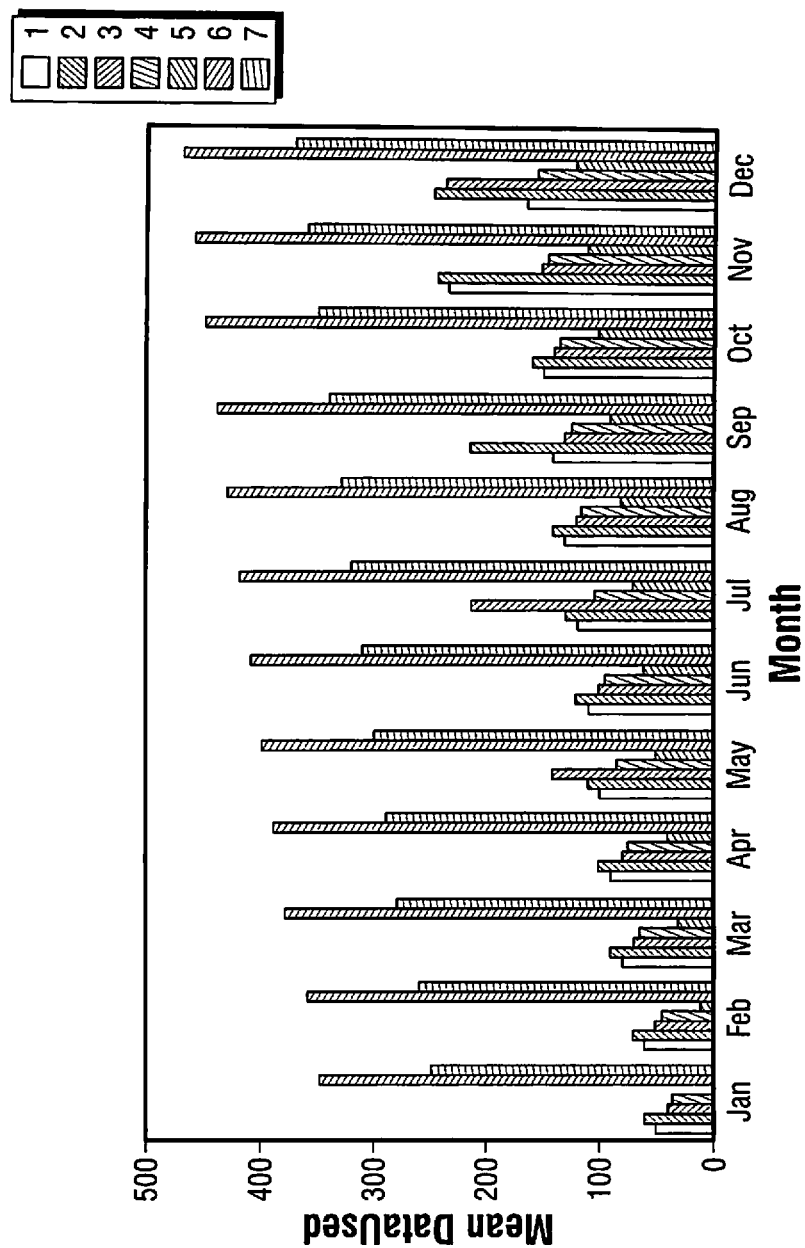
FIG. 8 is a graph of data usage as a function of the month of the year, further broken down by total data usage for the day of the week within each month.

FIG. 8 is a graph of data usage as a function of the month of the year, further broken down by total data usage for the day of the week within each month. In this data set, all data usage on the Mondays within a given month is reflected in the first bar shown for the given month; all data usage on the Tuesdays within a given month is reflected in the second bar shown for the given month; and so on. A linear regression model can be generated from this data. The model captures the cyclic trend of data consumption in the days of a week and the increasing trend between months of the year. The model also factors in whether a given day is a holiday (other than a weekend).

FIG. 9 shows a predicted daily model by linear regression (least square method). The Match( ) function is a lookup function for the coefficient value such that if the month of interest is January, the Match(Month) function returns the coefficient −64.2028. If the month of interest is February, the Match(Month) function returns the coefficient −53.9627, and so on. The same process is used for the Match(Day) function for the day of the week and the Match(Holiday) function for regular days or holidays. If the day is a holiday, for example, the Holiday value is 1. Otherwise, the value 0 is used for a regular day.

By way of example, if the day of interest is January $2^{nd}$, and it is a Saturday and not a holiday, the model can predict data usage for that day by using a beginning value of 176.1055, the coefficient for the month as −64.2028 (January), the coefficient for the day (Saturday) as 232.3522, and the coefficient for a Holiday (not a holiday) as 0.

Therefore, predicted data usage is calculated as:

176.1055−64.2028+232.3522+0=344.2549 MB.

To get the predicted hourly data usage, the daily data usage is divided by 24. Therefore, hourly data usage is 344.2549/24=14.3439 MB.

Hourly Linear Regression Model

In the daily linear regression model above, after the model predicted the consumption for a particular day, it is assumed that the consumption is fairly constant throughout the day, and thus calculated hourly data usage by dividing the daily data usage by 24. However, this most likely will not be accurate since in most households the consumption peaks in the evening when all of the users are at home. The hourly linear regression model addresses this issue by also factoring in the varying hourly data consumption.

For the hourly linear regression model, rather than using absolute hours (1, 2, 3, to 24) for a day, the hours may be divided into four consumption slots of six hours each: Morning=6:00 AM to 12:00 PM (noon); Afternoon=12:00 PM to 6:00 PM; Evening=6:00 PM to 12:00 AM (midnight), and Latenight=12:00 AM to 6:00 AM.

Figure 10:
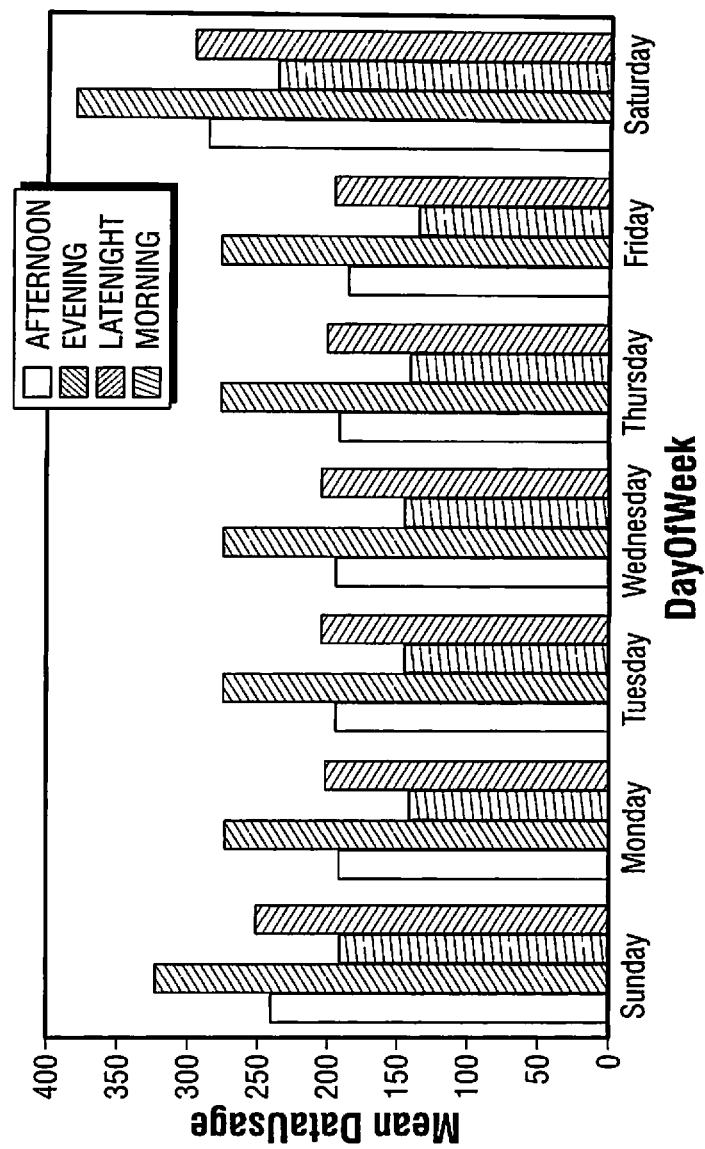
FIG. 10 is a graph of data usage as a function of day of the week with each day divided into four hourly consumption slots.

FIG. 10 is a graph of data usage as a function of day of the week with each day divided into the four hourly consumption slots—Afternoon, Evening, Latenight, and Morning. Peaks during the Evening consumption slots and lulls during the Latenight consumption slots are clearly shown. This is the extra variance that the hourly model additionally considers unlike the daily model.

The hourly model further extends the daily model and factors in the changes in data consumption during the day as well. The hourly linear model for the sample data consumption is as follows:

$$Y \text{ (data usage)} = $$
$$216.68795615922 + \text{Match}( :\text{Month},$$
"Jan", −80.2613838511671,
"Feb", −59.5790013767377,
"Mar", −39.7630742128736,
"Apr", −38.9683126516245,
"May", −19.667194188916,
"Jun", −19.0024082059563,
"Jul", 2.76771125147986,
"Aug", 0.980767939037308,
"Sep", 21.0297684673256,
"Oct", 41.2700073167424,
"Nov", 71.4088052686746,
"Dec", 119.784314244016,
•
$$) + \text{Match}( :\text{Day},$$
"Sunday", 28.8403113080191,
"Monday", −22.115855854498,
"Tuesday", −20.7869869823416,
"Wednesday", −21.7137269215478,
"Thursday", −21.7522871807984,
"Friday", −21.771293353044,
"Saturday", 79.2998389842111,
•
$$) + 0.234032664907081 * :\text{Holiday} + \text{Match}( :\text{TimeSlotOfDay},$$
"Afternoon", −14.7992697256219,
"Evening", 84.3978091768658,
"Latenight", −64.799269725622,
"Morning", −4.79926972562194,
•
)

Figure 11:
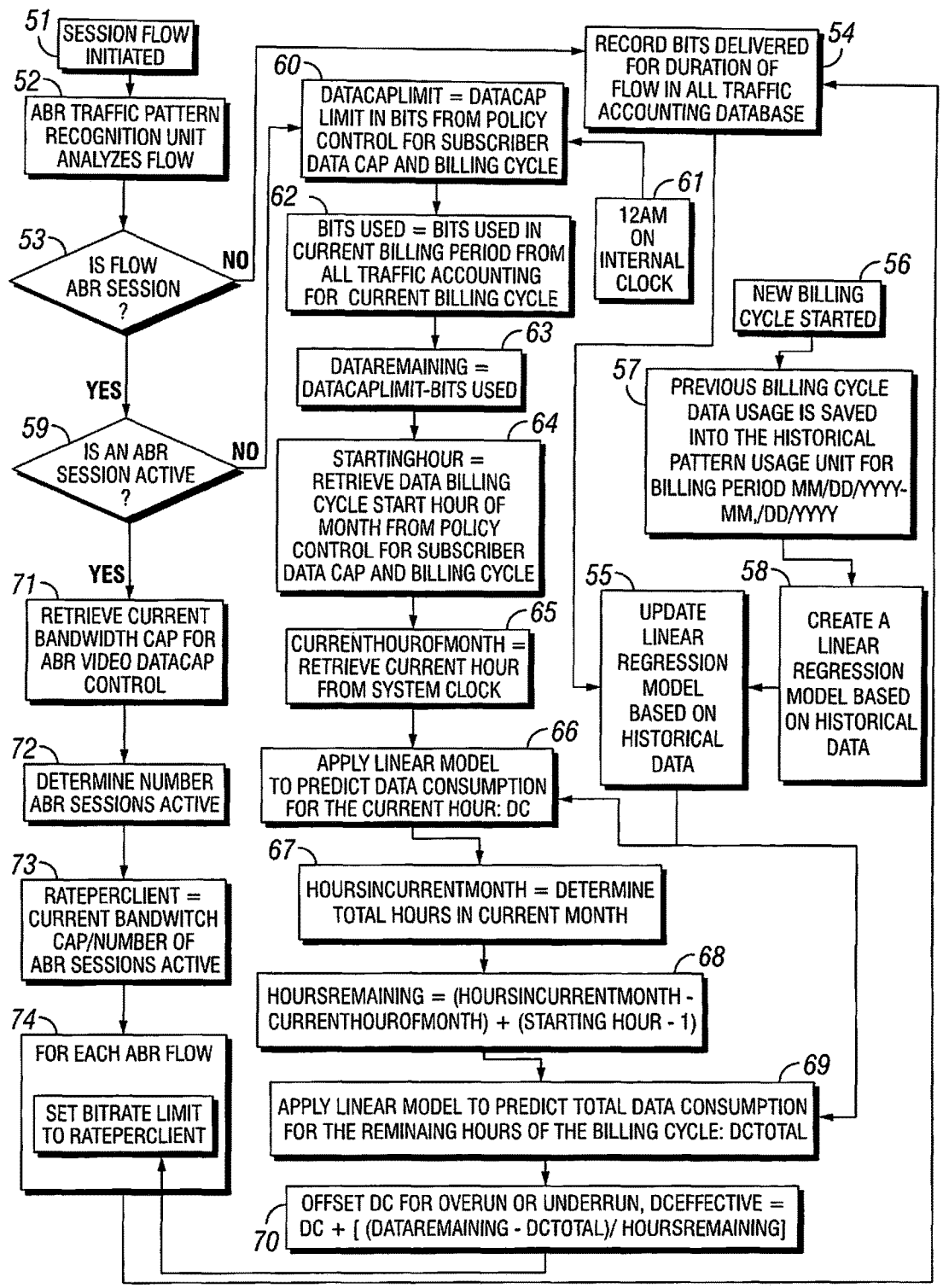
FIG. 11 is a flow chart of a method of data cap management utilizing hourly historical household usage (Linear Regression Hourly) in accordance with an exemplary embodiment of the present disclosure.

FIG. 11 is a flow chart of a method of personalized Datacap management utilizing hourly historical household usage (Linear Regression Hourly) in accordance with an exemplary embodiment of the present disclosure. The DataCap Management Unit 10 recognizes ABR flows, with non-ABR flows being used for accounting, but not for throttling. ABR flows are throttled based on projected data cap usage.

The illustrated method begins at step 51, where session flow to the home is initiated. At step 52, the ABR Traffic Pattern Recognition Unit 19 analyzes the flow. At step 53 the ABR Traffic Pattern Recognition Unit determines whether the flow is an ABR session. If not, the method moves to step 54 where bits delivered for the duration of the flow are recorded in the All Traffic Accounting Database 22. At step 55, this non-ABR usage information is used to update the linear regression model based on historical data. Note that the linear regression model is also updated using information whenever a new billing cycle starts at step 56. At step 57, data usage from the previous billing cycle is saved into the Historical Pattern Usage unit 21. At step 58, a linear regression model is created based on the historical data, and this information is also used at step 55 to update the linear regression model.

If it is determined at step 53, however, that the flow is an ABR session, the method moves to step 59 where the ABR Traffic Pattern Recognition Unit 19 determines whether an ABR session is active. If it is determined that an ABR session is not active, the method moves to step 60, where the term dataCapLimit is set equal to DataCap Limit in bits obtained from the Policy Control for Subscriber Data Cap and Billing Cycle Unit 23. As shown in block 61, an internal system clock is set at the start of the day, i.e., 12:00 am. At step 62, the term bitsUsed is set equal to the bits used in the current billing period as obtained from the All Traffic Accounting Database for Current Billing Cycle 22. At step 63, the term dataRemaining is calculated using the formula:

dataRemaining=dataCapLimit−bitsUsed.

At step 64, the term startingHour is set equal to the Data Billing Cycle Start hour of the month as retrieved from the Policy Control for Subscriber Data Cap and Billing Cycle Unit 23. At step 65, the term currentHourOfMonth is set equal to the current hour retrieved from the internal system clock. At step 66, the DataCap Management Unit applies the updated linear regression model from step 55 to predict data consumption for the current hour ($D_c$). At step 67, the term hoursInCurrentMonth is set equal to the total number of hours in the current month. At step 68, the term hoursRemaining is calculated using the formula:

hoursRemaining=(hoursInCurrentMonth−currentHourOfMonth)+(startingHour−1).

At step 69, the DataCap Management Unit applies the updated linear regression model from step 55 to predict total data consumption for the remaining hours of the billing cycle ($D_{ctotal}$). At step 70, $D_c$ is offset for an overrun or underrun using the formula:

$$D_{ceffective}=D_c+[(\text{data remaining}-D_{ctotal})/\text{hoursRemaining}].$$

If it is determined at step 59 that an ABR session is active, the method moves to step 71 where the current bandwidth cap for ABR video is retrieved from the Policy Control Unit 23. At step 72 the ABR Traffic Pattern Recognition Unit 19 determines the number of ABR sessions that are active. At step 73, the ABR Throttling Management Unit 18 calculates the term RatePerClient using the formula:

RatePerClient=current bandwidth cap/Number of ABR sessions active.

At step 74, for each ABR flow, the ABR Throttling Management Unit 18 sets a bit rate limit to a calculated RatePerClient using $D_{ceffective}$ from step 70 as an input.

Figure 12:
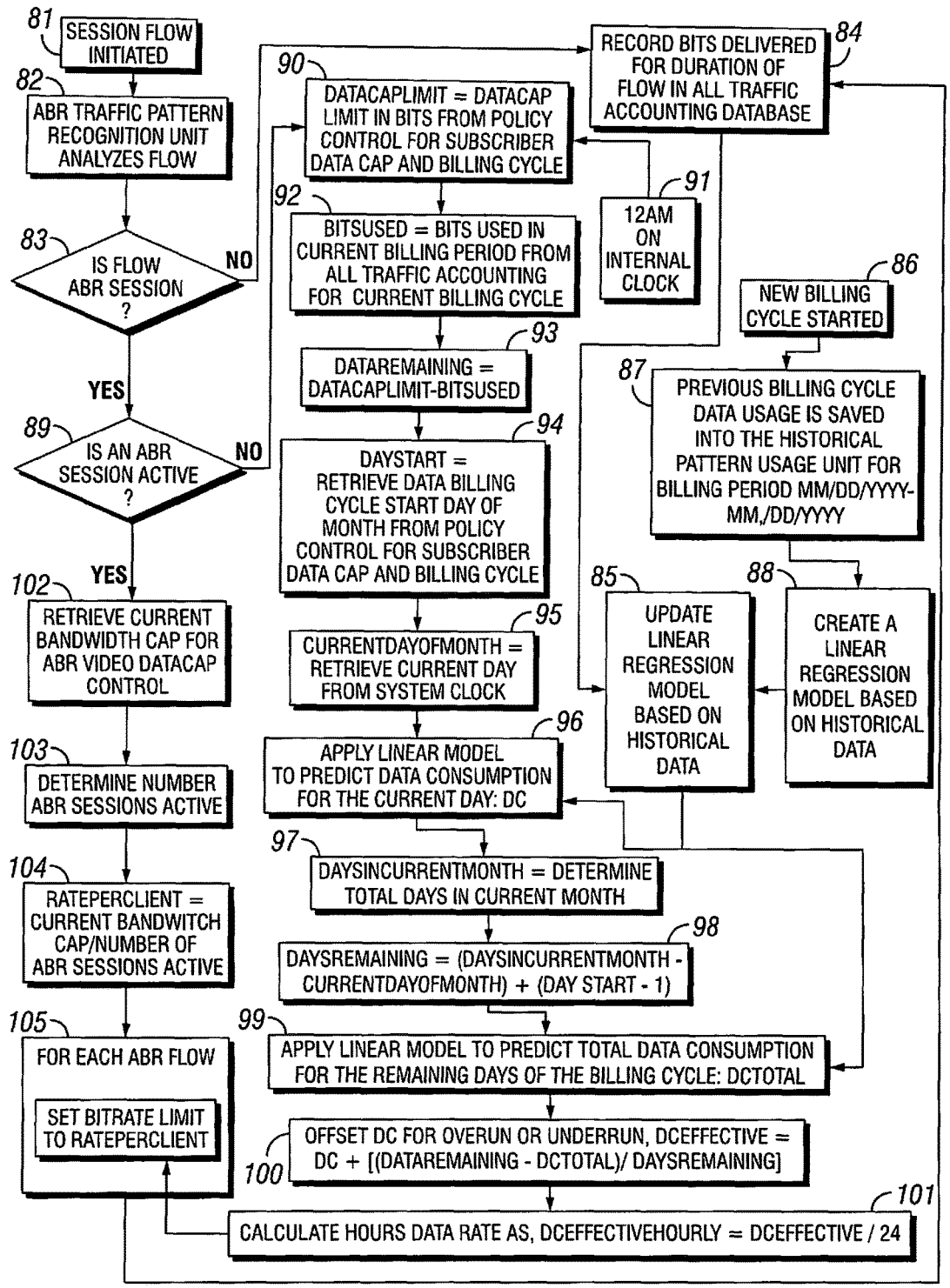
FIG. 12 is a flow chart of a method of data cap management utilizing daily historical household usage (Linear Regression Daily) in accordance with an exemplary embodiment of the present disclosure.

FIG. 12 is a flow chart of a method of data cap management utilizing daily historical household usage (Linear Regression Daily) in accordance with an exemplary embodiment of the present disclosure. The DataCap Management Unit 10 recognizes ABR flows, with non-ABR flows being used for accounting, but not for throttling. ABR flows are throttled based on projected data cap usage.

The illustrated method begins at step 81, where session flow to the home is initiated. At step 82, the ABR Traffic Pattern Recognition Unit 19 analyzes the flow. At step 83 the ABR Traffic Pattern Recognition Unit determines whether the flow is an ABR session. If not, the method moves to step 84 where bits delivered for the duration of the flow are recorded in the All Traffic Accounting Database 22. At step 85, this non-ABR usage information is used to update the linear regression model based on historical data. Note that the linear regression model is also updated using information whenever a new billing cycle starts at step 86. At step 87, data usage from the previous billing cycle is saved into the Historical Pattern Usage unit 21. At step 88, a linear regression model is created based on the historical data, and this information is also used at step 85 to update the linear regression model.

If it is determined at step 83, however, that the flow is an ABR session, the method moves to step 89 where the ABR Traffic Pattern Recognition Unit 19 determines whether an ABR session is active. If it is determined that an ABR session is not active, the method moves to step 90, where the term dataCapLimit is set equal to DataCap Limit in bits obtained from the Policy Control for Subscriber Data Cap and Billing Cycle Unit 23. As shown in block 91, an internal system clock is set at the start of the day, i.e., 12:00 am. At step 92, the term bitsUsed is set equal to the bits used in the current billing period as obtained from the All Traffic Accounting Database for Current Billing Cycle 22. At step 93, the term dataRemaining is calculated using the formula:

dataRemaining=dataCapLimit−bitsUsed.

At step 94, the term dayStart is set equal to the Data Billing Cycle Start Day of the month as retrieved from the Policy Control for Subscriber Data Cap and Billing Cycle Unit 23. At step 95, the term currentDayOfMonth is set equal to the current day retrieved from the internal system clock. At step 96, the DataCap Management Unit applies the updated linear regression model from step 85 to predict data consumption for the current day ($D_r$). At step 97, the term daysInCurrentMonth is set equal to the total number of days in the current month. At step 98, the term daysRemaining is calculated using the formula:

daysRemaining=(daysInCurrentMonth−currentDayOfMonth)+(dayStart−1).

At step 99, the DataCap Management Unit applies the updated linear regression model from step 85 to predict total data consumption for the remaining days of the billing cycle ($D_{ctotal}$). At step 100, $D_c$ is offset for an overrun or underrun using the formula:

$D_{ceffective} = D_c + [(\text{data remaining} - D_{ctotal})/\text{daysRemaining}]$.

At step 101, the DataCap Management Unit calculates an hours data rate using the formula:

$D_{ceffectiveHourly} = D_{ceffective}/24$.

If it is determined at step 89 that an ABR session is active, the method moves to step 102 where the current bandwidth cap for ABR video is retrieved from the Policy Control Unit 23. At step 103 the ABR Traffic Pattern Recognition Unit 19 determines the number of ABR sessions that are active. At step 104, the ABR Throttling Management Unit 18 calculates the term RatePerClient using the formula:

RatePerClient=current bandwidth cap/Number of ABR sessions active.

At step 105, for each ABR flow, the ABR Throttling Management Unit 18 sets a bit rate limit to a calculated RatePerClient using $D_{ceffectiveHourly}$ from step 101 as an input.

Historical Usage Alpha (α) Generation Method

It is possible to reduce the chance of a customer hitting their data cap by rate-limiting ABR video content. Rate limiting other content is not very useful because there are not options for non-ABR content. A game patch or software package has a fixed size. ABR content has multiple byte sizes available, and the version viewed determines how much of the data cap is consumed.

In the techniques disclosed herein, there are two important formulas. The first relates to how a rate limit (r) is selected for a video stream:

$r = \alpha \cdot b_r / t_r$ where $b_r$ is the amount of data remaining in the user's data cap; $t_r$ is the time remaining in the billing period; and α is a duty cycle factor for adjusting r. In a perfect world with theoretically perfect future knowledge, an α can be determined using the following formula:

$\alpha = t_m / t_c$ where $t_m$ is the time in the billing cycle and $t_c$ is the time spent consuming video. Realistically, however, a variety of other methodologies must be utilized to approximate perfect future knowledge.

One such methodology is to simulate the effect of various values of α on data usage patterns harvested from historical data and pick an α that best accomplishes the desired goal. To set a desired goal, one must understand how choosing the "wrong" α can affect the user.

If the value of α matches the $t_m/t_c$ and the user's usage is evenly distributed throughout the month, the user's viewing experience will be rather uniform.

If the value of α is low, the user will be constrained to a lower rate at the beginning of the month, but later in the month his rate will increase because he is not actually consuming data as fast as predicted, and his experience will improve.

If the value of α is high, the user will enjoy higher bit rates at the beginning of the month, but as he consumes data more quickly than predicted, the formulas will begin to restrict his bandwidth. It is quite likely that the user will consume so much of his data cap that his computed rate will fall beneath that necessary to view even the lowest available bit rate of the content. Table 1 below illustrates the effect of different values of α for different levels of data usage.

TABLE 1

| data usage is | lesser α | estimated α | higher α |
|---|---|---|---|
| lower than expected | start low rate, end high | start medium, end high | start high, end high |
| as expected | start low, end high | start medium, end medium | start high, end low or depleted |
| higher than expected | start low, end low | start medium, end low or depleted | start high, end depleted |

In order to reduce the impact and likelihood of the worst-case scenario, it is best to pick an $\alpha$ lower than the predicted "optimal" value and rely on the self-tuning nature of the formulas to either give a better experience at the end of the month or prevent excessive throttling at the end of the month.

Choosing $\alpha$ Based on Simulations

Another methodology for determining $\alpha$ is to take a series of ABR usage scenarios and simulate the effect on them of varying $\alpha$. One way to select the simulated scenarios is to pull them from the user's own behavioral history.

Start with an $\alpha$ based on the $t_m/t_c$ formula and run a simulation. Give that simulation a score.

One algorithm for scoring the simulation may be based on the ratio of the starting bit rate to the final bit rate. Based on the discussion regarding the desired goal above, it is good for the final bit rate at the end of the simulation to be a little higher than the bit rate at the start of the simulation. That means that an $\alpha$ has been chosen that still works if the actual data usage ends up being slightly higher than the simulated scenario. For example, a final/start ratio of 1.15 may be ideal (this value is negotiable). If a simulated run gives a ratio of 1.15 then it is "optimal". If the ratio is over 1.15, then the score is lower. If the ratio is under 1.15, then the score is lower and a penalty factor should be applied (because the low ratio indicates the method caused a bit-famine, which is the worst possible outcome.

Next, run some simulations on alternate values of $\alpha$ and score those. If one of the boundaries has the maximum, then extrapolate and pick an $\alpha$ farther in that direction (although $\alpha$ must be greater than 0). Quickly, a boundary will be found that has a lower score. A binary search can then be performed to refine the value of $\alpha$.

Figure 13:
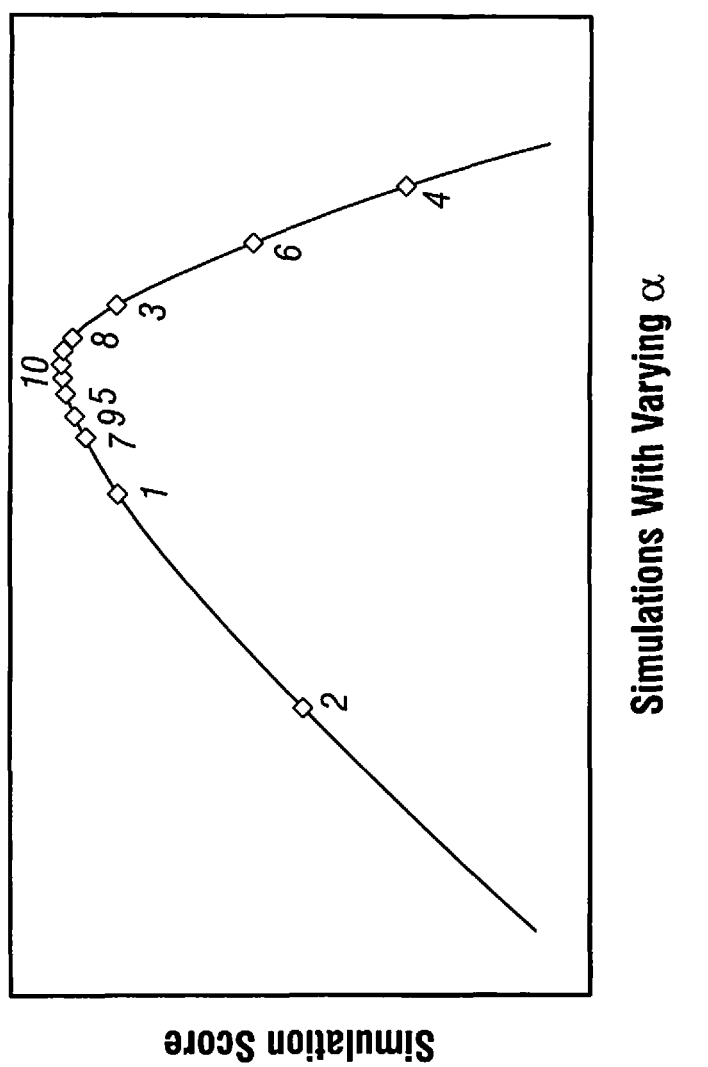
FIG. 13 is a graph of simulation scores as a function of simulations with varying values of $\alpha$.

FIG. 13 is a graph of simulation scores as a function of simulations with varying values of $\alpha$. FIG. 13 illustrates an example of how simulation scores are optimized by extrapolating until a maximum value is straddled (trials 1-4) followed by interpolating (trials 5-12) to determine the optimum score in trial 10.

Figure 14:
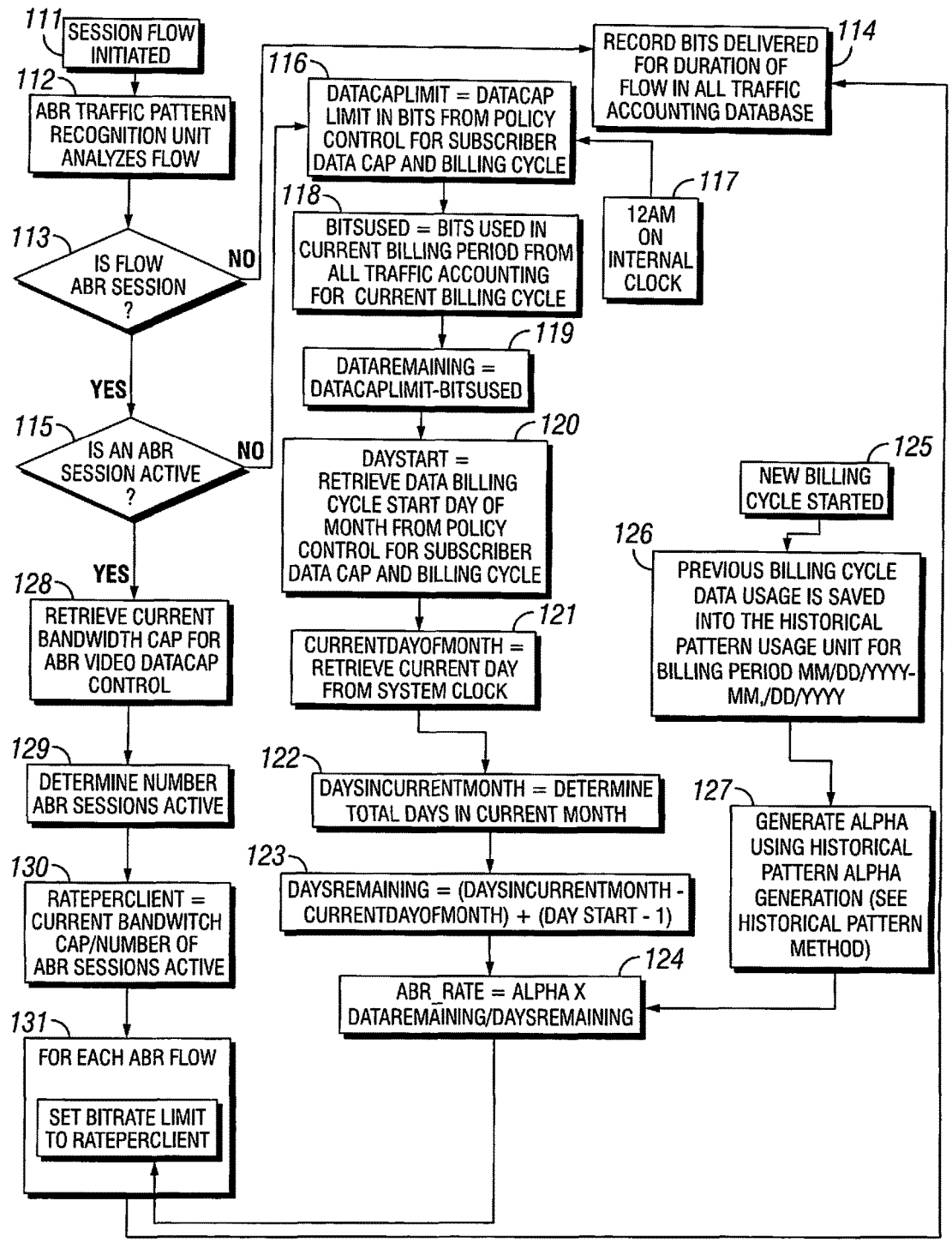
FIG. 14 is a flow chart of a method of data cap management utilizing historical household usage (Historical Usage) in accordance with an exemplary embodiment of the present disclosure.

FIG. 14 is a flow chart of a method of data cap management utilizing historical household usage (Historical Usage) in accordance with an exemplary embodiment of the present disclosure. The illustrated method begins at step 111, where session flow to the home is initiated. At step 112, the ABR Traffic Pattern Recognition Unit 19 analyzes the flow. At step 113 the ABR Traffic Pattern Recognition Unit determines whether the flow is an ABR session. If not, the method moves to step 114 where bits delivered for the duration of the flow are recorded in the All Traffic Accounting Database 22.

If it is determined at step 113, however, that the flow is an ABR session, the method moves to step 115 where the ABR Traffic Pattern Recognition Unit 19 determines whether an ABR session is active. If it is determined that an ABR session is not active, the method moves to step 116, where the term dataCapLimit is set equal to DataCap Limit in bits obtained from the Policy Control for Subscriber Data Cap and Billing Cycle Unit 23. As shown in block 117, an internal system clock is set at the start of the day, i.e., 12:00 am. At step 118, the term bitsUsed is set equal to the bits used in the current billing period as obtained from the All Traffic Accounting Database for Current Billing Cycle 22. At step 119, the term dataRemaining is calculated using the formula:

dataRemaining=dataCapLimit−bitsUsed.

At step 120, the term dayStart is set equal to the Data Billing Cycle Start Day of the month as retrieved from the Policy Control for Subscriber Data Cap and Billing Cycle Unit 23. At step 121, the term currentDayOfMonth is set equal to the current day retrieved from the internal system clock. At step 122, the term daysInCurrentMonth is set equal to the total number of days in the current month. At step 123, the term daysRemaining is calculated using the formula:

daysRemaining=(daysInCurrentMonth−currentDayOfMonth)+(dayStart−1).

At step 124, the term ABR_Rate is calculated using the formula:

ABR_Rate=Alpha×dataRemaining/daysRemaining.

The value of Alpha may be generated as shown in steps 125-127. At step 125, a new billing cycle starts. At step 126, data usage from the previous billing cycle is saved into the Historical Pattern Usage unit 21. At step 127, Alpha is generated using Historical Pattern Alpha Generation (see Historical Pattern Method).

If it is determined at step 115 that an ABR session is active, the method moves to step 128 where the current bandwidth cap for ABR video is retrieved from the Policy Control Unit 23. At step 129 the ABR Traffic Pattern Recognition Unit 19 determines the number of ABR sessions that are active. At step 130, the ABR Throttling Management Unit 18 calculates the term RatePerClient using the formula:

RatePerClient=current bandwidth cap/Number of ABR sessions active.

At step 131, for each ABR flow, the ABR Throttling Management Unit 18 sets a bit rate limit to a calculated RatePerClient using ABR_Rate from step 124 as an input.

Figure 15:
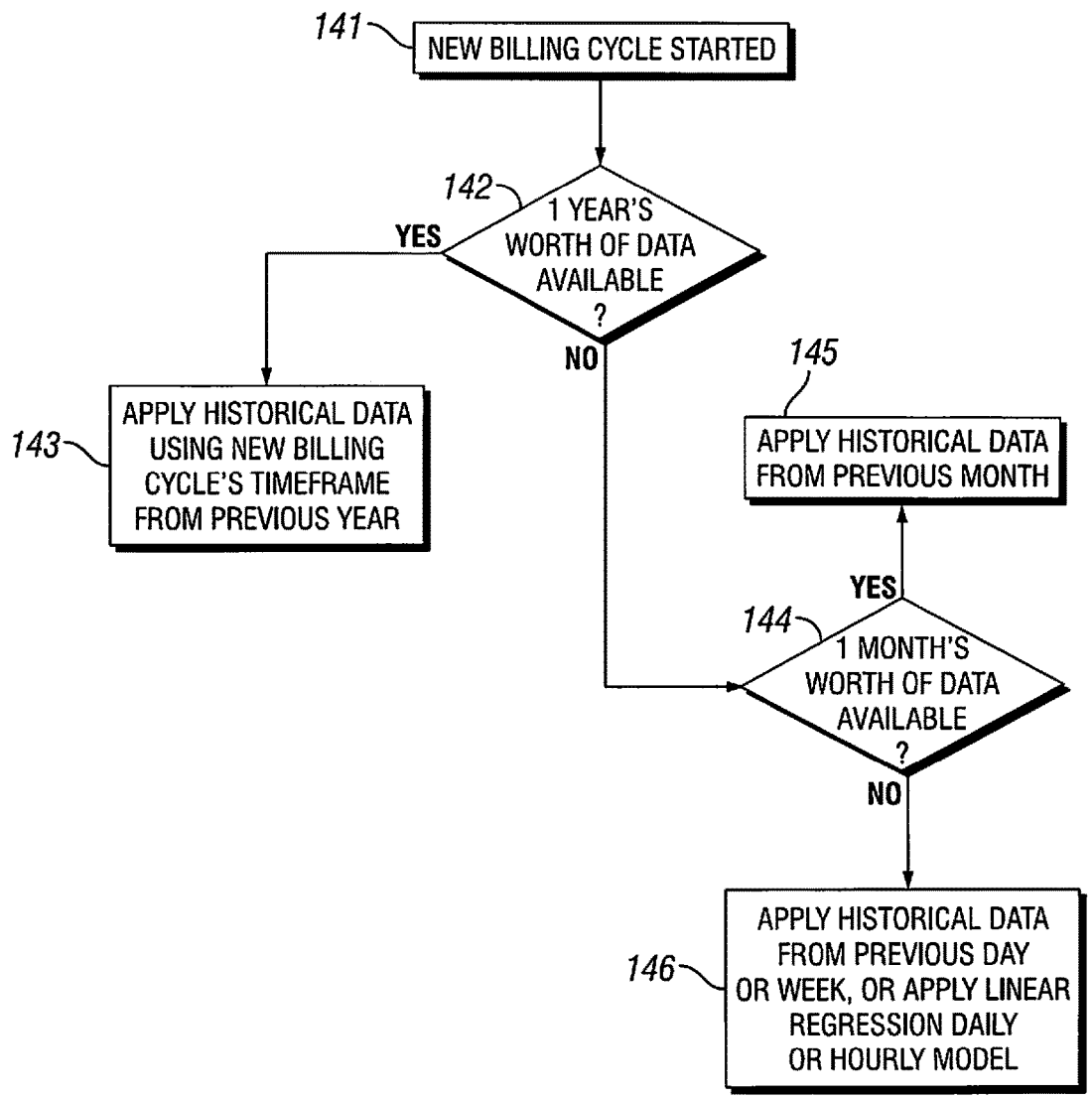
FIG. 15 is a flow chart of a method of selecting a time period for historical household usage data in accordance with an exemplary embodiment of the present disclosure.

FIG. 15 is a flow chart of a method of selecting a time period for historical household usage data in accordance with an exemplary embodiment of the present disclosure. The historical data may be based on recent usage (for example, predicting June 2016 from May 2016), or may be based on usage at the same time in previous years (for example, predicting June 2016 from June 2015). The method begins at step 141 when a new billing cycle is started. At step 142, it is determined whether there is a full year's worth of data usage information available. If a full year's worth of data usage information is available, the method moves to step 143 where historical data usage information is applied using the new billing cycle's time frame from the previous year. For example, if the new billing cycle is for the month of September, historical data usage information from the previous September is applied.

If a full year's worth of data usage information is not available, the method moves to step 144 where it is determined whether there is a month's worth of data usage information available. If so, the method moves to step 145 where historical data usage information from the previous month is applied. If a month's worth of data usage information is not available, the method moves to step 146 where the system may apply historical data usage information from a previous day or week, or may apply a linear regression daily or hourly model.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method implemented by a DataCap Management Unit for controlling data usage at a customer premises, the method comprising:
   predicting future data usage by a plurality of client devices at the customer premises for a current billing cycle, wherein one or more of the client devices are engaged in adaptive video bitrate (ABR) stream flows, and wherein one or more of the client devices are engaged in non-ABR stream flows;
   monitoring all actual data usage by the plurality of client devices at a single point of entry for the customer premises;
   dynamically adjusting a premises bandwidth cap throughout the current billing cycle, using the predicted future data usage as an input, to keep actual total data usage for the current billing cycle from exceeding a data cap before the current billing cycle ends; and
   throttling only the ABR stream flows and not the non-ABR stream flows to maintain a current premises bitrate within the premises bandwidth cap.

2. The method according to claim 1, wherein predicting the future data usage includes generating a linear regression model for future data usage at the customer premises based on past data usage at the customer premises.

3. The method according to claim 2, further comprising updating the linear regression model by recalculating coefficients as more recent data usage information becomes available.

4. The method according to claim 2, wherein the linear regression model utilizes a least square method.

5. The method according to claim 2, wherein the dynamically adjusting the premises bandwidth cap comprises:
   applying the linear regression model to predict data consumption (Dc) for a current day;
   applying the linear regression model to predict total data consumption (Dctotal) for remaining days of the current billing cycle;
   calculating an offset of the Dc for an overrun or underrun (Dceffective) by adding to the Dc, a value: (data remaining within the data cap for the current billing cycle−Dctotal)/days remaining in the current billing cycle; and
   calculating an hourly premises bandwidth cap by dividing the Dceffective by 24.

6. The method according to claim 5, wherein there are a plurality of ABR stream flows active at the customer premises, and the method further comprises setting a bitrate limit for each ABR stream flow by dividing the hourly premises bandwidth cap by a number of the active ABR stream flows.

7. The method according to claim 2, wherein the dynamically adjusting the premises bandwidth cap comprises:
   applying the linear regression model to predict data consumption (Dc) for a current hour;
   applying the linear regression model to predict total data consumption (Dctotal) for remaining hours of the current billing cycle; and
   calculating an hourly premises bandwidth cap by adding to the Dc, a value: (data remaining within the data cap for the current billing cycle−Dctotal)/hours remaining in the current billing cycle.

8. The method according to claim 7, wherein there are a plurality of ABR stream flows active at the customer premises, and the method further comprises setting a bitrate limit for each ABR stream flow by dividing the hourly premises bandwidth cap by a number of the active ABR stream flows.

9. The method according to claim 1, wherein the predicting future data usage comprises generating a historical usage alpha-generation model for data usage at the customer premises based on historical data usage patterns at the customer premises during past billing cycles.

10. The method according to claim 9, wherein the billing cycles are months, and when more than a year's worth of historical data usage information is available, generating a historical model for data usage at the customer premises includes generating a historical model for a current month utilizing data usage information from the same month from a previous year.

11. The method according to claim 9, wherein the billing cycles are months, and when more than one month but less than a year's worth of historical data usage information is available, generating a historical model for data usage at the customer premises includes generating a historical model for a current month utilizing data usage information from a previous month.

12. The method according to claim 9, wherein the throttling includes:
   generating a value, $\alpha$, equal to a time in the billing cycle ($t_m$) divided by a time spent consuming video ($t_c$) based on the historical data usage patterns at the customer premises during past billing cycles;
   calculating, for a sum of all ABR stream flows entering the customer premises, an allowed data rate (ABR_Rate) by multiplying the $\alpha$ by a data remaining within the data cap divided by a number of days remaining in the billing cycle; and
   setting a bitrate limit for each ABR stream flows based on the ABR_Rate and a number of ABR stream flows.

13. The method according to claim 1, further comprising:
   receiving an indication that a user desires to change a Datacap management type;
   analyzing data flow;
   generating a usage pattern graph based on a liner regression model;
   generating a usage pattern graph based on a historical usage alpha-generation model;
   displaying the usage pattern graphs for the user;
   receiving an indication of a selection by the user to use either the linear regression model or the historical usage alpha-generation model to at least predict the future data usage;
   applying datacap bandwidth management on data usage of a current month using either the linear regression model or the historical usage alpha-generation model which was selected by the user; and
   applying a bandwidth limiter to a current calculation of allowed bandwidth using either the linear regression model or the historical usage alpha-generation model which was selected by the user.

14. The method according to claim 1, further comprising:
   receiving an indication that a user desires to have the DataCap Management unit to select to use either a linear regression model or a historical usage alpha-generation model to at least predict the future data usage; and
   recognizing which of the linear regression model or the historical usage alpha-generation model is best to use based on examining changes over a time period and automatically switching to either the linear regression model or the historical usage alpha-generation model which offers a minimal change over the time period.

15. A DataCap Management Unit configured to control data usage at a customer premises, the DataCap Management Unit comprising:
- an interface configured to receive all data entering the customer premises and to monitor all data usage by a plurality of client devices at the customer premises; and
- a processing circuit configured to:
  - predict future data usage by the plurality of client devices at the customer premises for a current billing cycle, wherein one or more of the client devices are engaged in adaptive video bitrate (ABR) stream flows, and wherein one or more of the client devices are engaged in non-ABR stream flows;
  - dynamically adjust a premises bandwidth cap throughout the current billing cycle, using the predicted future data usage as an input, to keep actual total data usage for the current billing cycle from exceeding a data cap before the current billing cycle ends; and
  - throttle only the ABR stream flows and not the non-ABR stream flows to maintain a current premises bitrate within the premises bandwidth cap.

16. The DataCap Management Unit according to claim 15, wherein the processing circuit is configured to predict the future data usage by generating a linear regression model for future data usage at the customer premises based on past data usage at the customer premises.

17. The DataCap Management Unit according to claim 16, wherein the processing circuit is configured to update the linear regression model by recalculating coefficients as more recent data usage information becomes available.

18. The DataCap Management Unit according to claim 16, wherein the linear regression model utilizes a least square method.

19. The DataCap Management Unit according to claim 16, wherein the processing circuit is configured to:
- apply the linear regression model to predict a data consumption (Dc) for a current day;
- apply the linear regression model to predict a total data consumption (Dctotal) for remaining days of the current billing cycle;
- calculate an offset of the Dc for an overrun or underrun (Dceffective) by adding to the Dc, a value: (data remaining within the data cap for the current billing cycle −Dctotal) / days remaining in the current billing cycle; and
- calculate an hourly premises bandwidth cap by dividing the Dceffective by 24.

20. The DataCap Management Unit according to claim 19, wherein there are a plurality of ABR stream flows active at the customer premises, and the processing circuit is configured to set a bitrate limit for each ABR stream flow by dividing the hourly premises bandwidth cap by a number of the active ABR steam flows.

21. The DataCap Management Unit according to claim 16, wherein the processing circuit is configured to:
- apply the linear regression model to predict a data consumption (Dc) for a current hour;
- apply the linear regression model to predict a total data consumption (Dctotal) for remaining hours of the current billing cycle; and
- calculate an hourly premises bandwidth cap by adding to the Dc, a value: (data remaining within the data cap for the current billing cycle−Dctotal)/hours remaining in the current billing cycle.

22. The DataCap Management Unit according to claim 21, wherein there are a plurality of ABR stream flows active at the customer premises, and the processing circuit is configured to set a bitrate limit for each ABR stream flow by dividing the hourly premises bandwidth cap by a number of the active ABR stream flows.

23. The DataCap Management Unit according to claim 15, wherein the processing circuit is configured to predict the future data usage by generating a historical usage alpha-generation model for data usage at the customer premises based on historical data usage patterns at the customer premises during past billing cycles.

24. The DataCap Management Unit according to claim 23, wherein the billing cycles are months, and when more than a year's worth of historical data usage information is available, the processing circuit is configured to generate a historical model for a current month utilizing data usage information from the same month from a previous year.

25. The DataCap Management Unit according to claim 23, wherein the billing cycles are months, and when more than one month but less than a year's worth of historical data usage information is available, the processing circuit is configured to generate a historical model for a current month utilizing data usage information from a previous month.

26. The DataCap Management Unit according to claim 15, wherein the processing circuit is further configured to:
- receive an indication that a user desires to change a Datacap management type;
- analyze data flow;
- generate a usage pattern graph based on a liner regression model;
- generate a usage pattern graph based on a historical usage alpha-generation model;
- display the usage pattern graphs for the user;
- receive an indication of a selection by the user to use either the linear regression model or the historical usage alpha-generation model to at least predict the future data usage;
- apply datacap bandwidth management on data usage of a current month using either the linear regression model or the historical usage alpha-generation model which was selected by the user; and
- apply a bandwidth limiter to a current calculation of allowed bandwidth using either the linear regression model or the historical usage alpha-generation model which was selected by the user.

27. The DataCap Management Unit according to claim 15, wherein the processing circuit is further configured to:
- receive an indication that a user desires to have the DataCap Management unit to select to use either a linear regression model or a historical usage alpha-generation model to at least predict the future data usage; and
- recognize which of the linear regression model or the historical usage alpha-generation model is best to use based on examining changes over a time period and automatically switch to either the linear regression model or the historical usage alpha-generation model which offers a minimal change over the time period.

28. The DataCap Management Unit according to claim 15, wherein the processing circuit is configured to throttle only the ABR stream flows and not the non-ABR stream flows by:
- generating a value, $\alpha$, equal to a time in the billing cycle ($t_m$) divided by a time spent consuming video ($t_c$) based on the historical data usage patterns at the customer premises during past billing cycles;
- calculating, for a sum of all ABR stream flows entering the customer premises, an allowed data rate (ABR_Rate) by multiplying the $\alpha$ by a data remaining within the data cap divided by a number of days remaining in the billing cycle; and setting a bitrate limit for each ABR stream flows based on the ABR_Rate and a number of ABR stream flows.

29. A system configured to control data usage at a customer premises, the system comprising:

a gateway providing a single point of entry for data entering the customer premises; and a DataCap Management Unit configured to:

receive all data entering the customer premises from the gateway and to monitor all data usage by a plurality of client devices at the customer premises;

predict future data usage by the plurality of client devices at the customer premises for a current billing cycle, wherein one or more of the client devices are engaged in adaptive video bitrate (ABR) stream flows, and wherein one or more of the client devices are engaged in non-ABR stream flows;

dynamically adjust a premises bandwidth cap throughout the current billing cycle, using the predicted future data usage as an input, to keep actual total data usage for the current billing cycle from exceeding a data cap before the current billing cycle ends; and throttle only the ABR stream flows and not the non-ABR stream flows to maintain a current premises bitrate within the premises bandwidth cap.

30. The system according to claim 29, wherein the DataCap Management Unit is further configured to:

receive an indication that a user desires to change a Datacap management type;

analyze data flow;

generate a usage pattern graph based on a liner regression model;

generate a usage pattern graph based on a historical usage alpha-generation model;

display the usage pattern graphs for the user;

receive an indication of a selection by the user to use either the linear regression model or the historical usage alpha-generation model to at least predict the future data usage;

apply datacap bandwidth management on data usage of a current month using either the linear regression model or the historical usage alpha-generation model which was selected by the user; and apply a bandwidth limiter to a current calculation of allowed bandwidth using either the linear regression model or the historical usage alpha-generation model which was selected by the user.

31. The system according to claim 29, wherein the DataCap Management Unit is further configured to:

receive an indication that a user desires to have the DataCap Management unit to select to use either a linear regression model or a historical usage alpha-generation model to at least predict the future data usage; and recognize which of the linear regression model or the historical usage alpha-generation model is best to use based on examining changes over a time period and automatically switch to either the linear regression model or the historical usage alpha-generation model which offers a minimal change over the time period.

32. The system according to claim 29, wherein the DataCap Management Unit is configured to:

generate a value, $\alpha$, equal to a time in the billing cycle ($t_m$) divided by a time spent consuming video ($t_c$) based on the historical data usage patterns at the customer premises during past billing cycles;

calculate, for a sum of all ABR stream flows entering the customer premises, an allowed data rate (ABR_Rate) by multiplying the a by a data remaining within the data cap divided by a number of days remaining in the billing cycle; and set a bitrate limit for each ABR stream flows based on the ABR_Rate and a number of ABR stream flow to, thereby, throttle only the ABR stream flows and not the non-ABR steam flows.

* * * * *